United States Patent [19]

Eng et al.

[11] Patent Number: 4,593,318
[45] Date of Patent: Jun. 3, 1986

[54] TECHNIQUE FOR THE TIME COMPRESSION MULTIPLEXING OF THREE TELEVISION SIGNALS

[75] Inventors: Kai Y. Eng, Cliffwood Beach; Barin G. Haskell, Tinton Falls; Robert L. Schmidt, Wanamassa, all of N.J.

[73] Assignee: AT&T Bell Laboratories, Murray Hill, N.J.

[21] Appl. No.: 500,954

[22] Filed: Jun. 3, 1983

[51] Int. Cl.⁴ .................... H04N 7/08; H04N 7/04
[52] U.S. Cl. ......................... 358/142; 358/146; 370/109
[58] Field of Search ............... 358/14, 15, 142, 146, 358/133, 135, 136, 260, 188; 370/109, 118

[56] References Cited

U.S. PATENT DOCUMENTS

| | | | |
|---|---|---|---|
| 4,161,629 | 7/1979 | Kits van Heyningen | 370/109 |
| 4,300,161 | 11/1981 | Haskell | 358/142 |
| 4,302,838 | 11/1981 | Haskell | 370/100 |
| 4,410,981 | 10/1983 | Flory | 370/109 |

OTHER PUBLICATIONS

Proc. IEE, vol. 111, No. 4, Apr. 1964, "Time-Compression-Multiplex Transmission", by J. E. Flood et al, pp. 647-668.
IEEE Trans. on Communications, vol. COM-22, No. 12, Dec. 1974, "Time Compression Multiplexing for Loop Transmission of Speech Signals", by D. H. Morgen et al, pp. 1932-1939.
IEEE Trans. on Cable Television, vol. CATV-3, No. 3, Jul. 1978, "A Time Compression Multiplex System for Multiple Video and Data Distribution Using Existing Satellite Channels", by D. Kirk, pp. 100-111.
BSTJ, vol. 60, No. 5, May-Jun. 1981, "Time-Frequency Multiplexing (TFM) of Two NTSC Color TV Signals-Simulation Results", by B. G. Haskell, pp. 643-660.
BSTJ, vol. 60, No. 9, Nov. 1981, "Spectral Properties and Band-Limiting Effects of Time-Compressed TV Signals in a Time-Compression Multiplexing System", by K. Y. Eng et al., pp. 2167-2184.
IEEE Trans. on Communications, vol. COM-29, No. 12, Dec. 1981, "Time Compression Multiplexing of Multiple Television Signals in Satellite Channels Using Chirp Transform Processors", by K. Y. Eng et al, pp. 1832-1840.
BSTJ, vol. 61, No. 10, Dec. 1982, "TV Bandwidth Compression Techniques Using Time-Companded Differentials and Their Applications to Satellite Transmissions", by K. Y. Eng et al, pp. 2917-2927.

Primary Examiner—Tommy P. Chin
Assistant Examiner—Michael D. Parker
Attorney, Agent, or Firm—Erwin W. Pfeifle

[57] ABSTRACT

The present invention relates to a Time Compression Multiplexing (TCM) technique for transmitting three consecutive television picture signals from a television picture source during the time period normally used to send one television picture signal. More particularly, three consecutive lines or fields from a TV signal source are compressed into an ordinary line or field period, respectively, by sending one line or field as is, but time compressed, in one portion of a line or field period and sending two other lines or fields as differential signals, also time compressed, to occupy two separate and different portions of the same line or field period as is used by the first one line or field. With such technique it is possible to send three consecutive line or field signals from each of three separate colocated or non-colocated TV sources on a Time Division Multiple Access (TDMA) basis.

24 Claims, 16 Drawing Figures

TECHNIQUE FOR THE TIME COMPRESSION MULTIPLEXING OF THREE TELEVISION SIGNALS

BACKGROUND OF THE INVENTION

1. Field of the Invention

The present invention relates to a technique for the Time Compression Multiplexing (TCM) of three TV signals and, more particularly, to a technique for simultaneously transmitting three fields of a television picture signal by a Time Compression Multiplexed signal where one field is transmitted as is, but time compressed, and the other two fields are transmitted as differential signals also time compressed such that all three fields fit into a single field period.

2. Description of the Prior Art

The tranmission of two or more high quality television (TV) signals through a particular band-limited channel as, for example, a satellite transponder of 36 MHz continues to be a challenge in optimizing the use of available channels or transponders in current as well as in the future systems.

One technique to better use such channel bandwidth was originally proposed in the article "Time-Frequency Multiplexing (TFM) of Two NTSC Color TV Signals—Simulation Results" by B. G. Haskell in BSTJ, Vol. 60, No. 5, May-June 1981, at pages 643–660, for transmitting two broadcast quality color television signals on terrestrial microwave radio facilities. With TFM as then defined, two successive lines, or fields, of one picture would be frequency multiplexed so that they could be sent in one line, or field, period. During the next time interval, two successive lines, or fields, from the other picture would be transmitted, thus avoiding any crosstalk between pictures. In order to reduce the bandwidth required for the TFM signal, one of the two simultaneously transmitted lines, or fields, would be sent as a bandlimited differential signal, modulated onto a vestigial sideband (VSB) carrier frequency situated above the baseband video. The resulting TFM signal could then be transmitted through the microwave radio facility via narrow band FM.

In the article "TV Bandwidth Compression Techniques Using Time Companded Differentials and Their Applications To Satellite Transmissions" by K. Y. Eng et al in BSTJ, Vol. 61, No. 10, December 1982, at pages 2917–2927, it was proposed to combine the concepts of time compression multiplexing (TCM) and differential signals to transmit up to three National Television System Committee (NTSC) color TV signals over a satellite transponder. More particularly, in accordance with the article, it appears possible to transmit three TV signals per transponder using a line differential compression method and a 30 meter earth station antenna or a field or line plus field differential compression method and a 10 meter antenna.

The problem remaining in the prior art is to provide better use of the frequency spectrum by permitting the simultaneous transmission of three TV signals during a single field period of a television picture signal.

SUMMARY OF THE INVENTION

The foregoing problem has been solved in accordance with the present invention which relates to a technique for the Time Compression Multiplexing (TCM) of three television signals and, more particularly, to a technique wherein three fields of a TV signal are sent simultaneously by transmitting one field as is, but time compressed, and the other two fields are transmitted as differential signals which are also time compressed such that all three signals fit into a single field period.

It is an aspect of the present invention to provide a TCM technique which will enable the transmission of three color television signals through a satellite transponder comprising, for example, a 36 MHz bandwidth wherein one field signal and two field differential signals are each time compressed to permit all three signals to be sent in the period of a normal field signal of a standard TV signal.

Other and further aspects of the present invention will become apparent during the course of the following description and by reference to the accompanying drawings.

BRIEF DESCRIPTION OF THE DRAWINGS

FIG. 14 is a block diagram of an alternative exemplary Differential Signal Multiplexer similar to FIG. 3 for use in the arrangement of FIG. 1 for generating one field signal as is, one field differential signal and one frame differential signal;

FIG. 15 is a block diagram of an exemplary alternative receiver similar to FIG. 13 for recovering three television picture signals wherein the received signal comprises one picture signal received as is and a field and frame differential signal; and FIG. 16 is a block diagram of an exemplary alternative receiver to the receiver of FIG. 13 for recovering three television picture signals wherein the received signal comprises one field signal received as is and two field differential signals.

DETAILED DESCRIPTION

In accordance with the present invention, three successive field signals from a television (TV) source are simultaneously transmitted in a single waveform by transmitting a first field as is, but time compressed, while transmitting the other two fields as either two field differential signals or as one field and one frame differential signal, both also time compressed, such that all three signals fit into a single field period. The resultant output waveform is then time multiplexed with two other similar waveforms from, for example, two other TV sources and transmitted via a terrestrial or satellite communication system.

Figure 1:
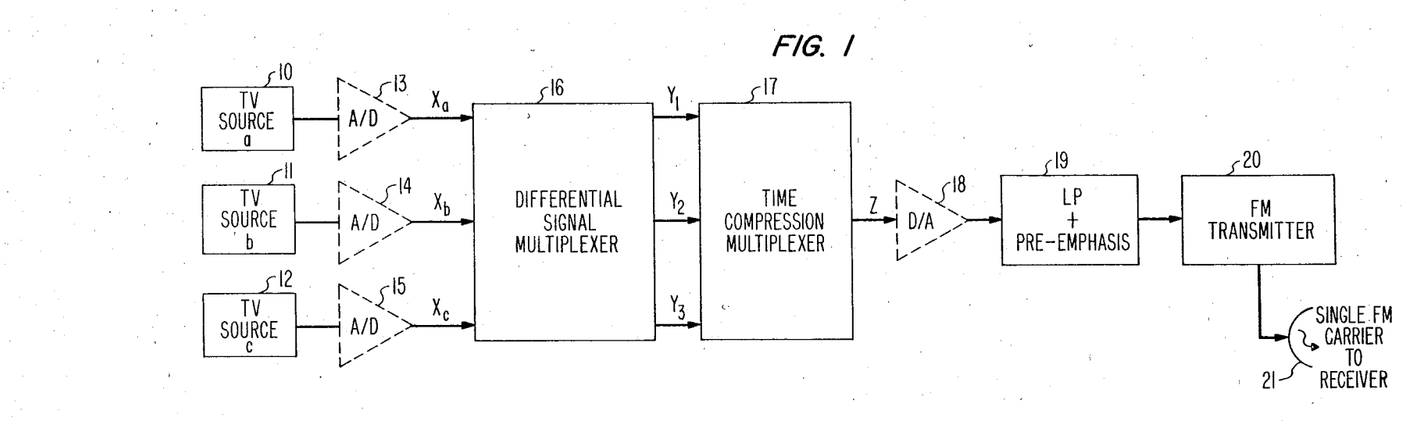
FIG. 1 is a block schematic of a transmitter for transmitting television picture signals from three colocated TV sources in accordance with the present invention.

FIG. 1 is a block diagram of an exemplary transmitting station in accordance with the present invention wherein three sychronized National Television System Committee (NTSC) TV signals from three TV sources 10-12, which hereinafter will also be designated a-c, respectively, for subscript purposes, are combined so that three successive fields 1-3 from a TV source are combined for simultaneous transmission by a single FM carrier on a time-division multiple access (TDMA) basis with similar transmissions from the two other colocated TV sources. As shown in FIG. 1, the TV input signals from three separate sources 10-12, also designated $TV_a$ to $TV_c$, are first digitized in optional Analog-to-Digital (A/D) converters 13-15, respectively. It is to be understood that such digitization may not be necessary if suitable analog components are used in the subsequent circuits. However, assuming that the digitized signals are desired, the digitized TV signals denoted by $X_i$, where i=a,b,c, are then processed by a Differential Signal Multiplexer 16. In Multiplexer 16, as will be explained in greater detail in conjunction with the discussion of FIGS. 2-6, an exemplary field signal, as is, plus a field and a frame differential signal are formed and multiplexed to generate three digital output signals designated $Y_i$, where i=1-3 during a first time period, which three signals are derived from three successive signals from the same TV source. During a second time period, three successive signals from the second TV source are transmitted followed by three successive signals from the third TV source during a third time period, whereafter the sequence repeats again.

The three simultaneous signals $Y_1-Y_3$ from Differential Signal Multiplexer 16 are then passed through a Time Compression Multiplexer 17 which combines the three signals associated with each TV source into a single digital stream designated Z, as will be explained in greater detail hereinafter in association with the discussion of FIGS. 7-9. The digital output signal from Time Compression Multiplexer 17 is converted to an analog output signal in an optional Digital-to-Analog (D/A) converter 18, which analog output signal is then passed through a low-pass filter and preemphasis circuit 19 before transmission to the remote receiver with a single FM carrier via FM transmitter 20 and an antenna 21.

Before describing an exemplary Differential Signal Multiplexer 16 for use in the arrangement of FIG. 1, it is to be understood that there are three types of differential signals which could be used: namely line differentials, field differentials and frame differentials which are well known in the art. However, for completeness, line differentials can be defined as a difference signal between two successive scan lines in the same field. In their digital implementation, this would mean a difference between more or less vertically adjacent picture elements (pels) from two successive lines in the same field, and the difference is chosen such that its amplitude is much smaller than the original signal on the average. Most importantly, such difference can be bandlimited to approximately 3 MHz without degrading picture quality.

Field differentials are defined essentially the same as line differentials except that the difference signal is derived from pels in adjacent lines in two successive fields. The bandwidth of field differentials can be further limited to approximately 2 MHz without affecting picture quality. Frame differentials are merely an extension of the field differentials by using pels from two temporally adjacent, or spatially coincident, lines from two successive frames. Frame differentials may be larger than field difference amplitudes for pictures containing movement, whereas for pictures containing no movement they should be smaller. The bandwidth required for frame differentials should be comparable to, or smaller than, that needed for field differentials. It is to be understood that in the following discussion, the transmitter of FIG. 1 will generate and transmit one field as is, but time compressed, and one field and one frame differential signal, also time compressed. Additionally, it is to be understood that the use of two line differentials or two field differentials will be a possible extension of the system.

Figure 2:
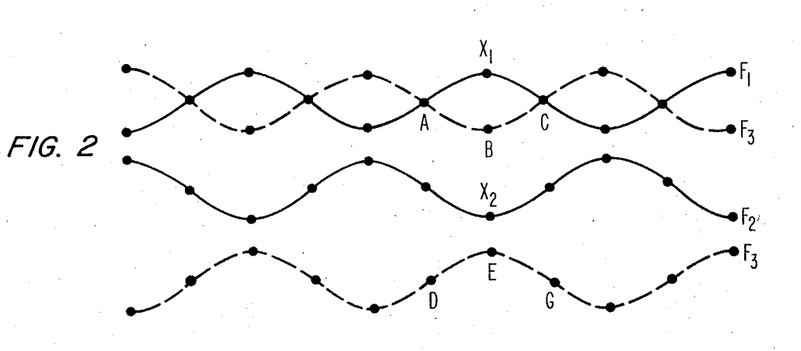
FIG. 2 illustrates interlaced lines from three successive fields (with a color subcarrier) for generating a field and a frame differential signal in the arrangement of FIG. 3.

More particularly, using the picture element (pel) definition shown in FIG. 2 corresponding to 4X the color subcarrier sample, a field differential and a frame differential signal might be defined as:

$$F_2 - F_3 = X_2 - P'_{X2}$$

where $$P_{X2} = \alpha B + (1-\alpha)(D+G-E) \quad (1)$$

and $$F_1 - F_3 = X_1 - P'_{X1}$$

where $$P_{X1} = A + C - B$$

and predictions $P_{X1}$ and $P_{X2}$ are peak limited as indicated with a prime, e.g., $P'_{X1}$, to ensure that such prediction is not outside the range of, for example, $X_1$ or $X_2$.

Figure 3:
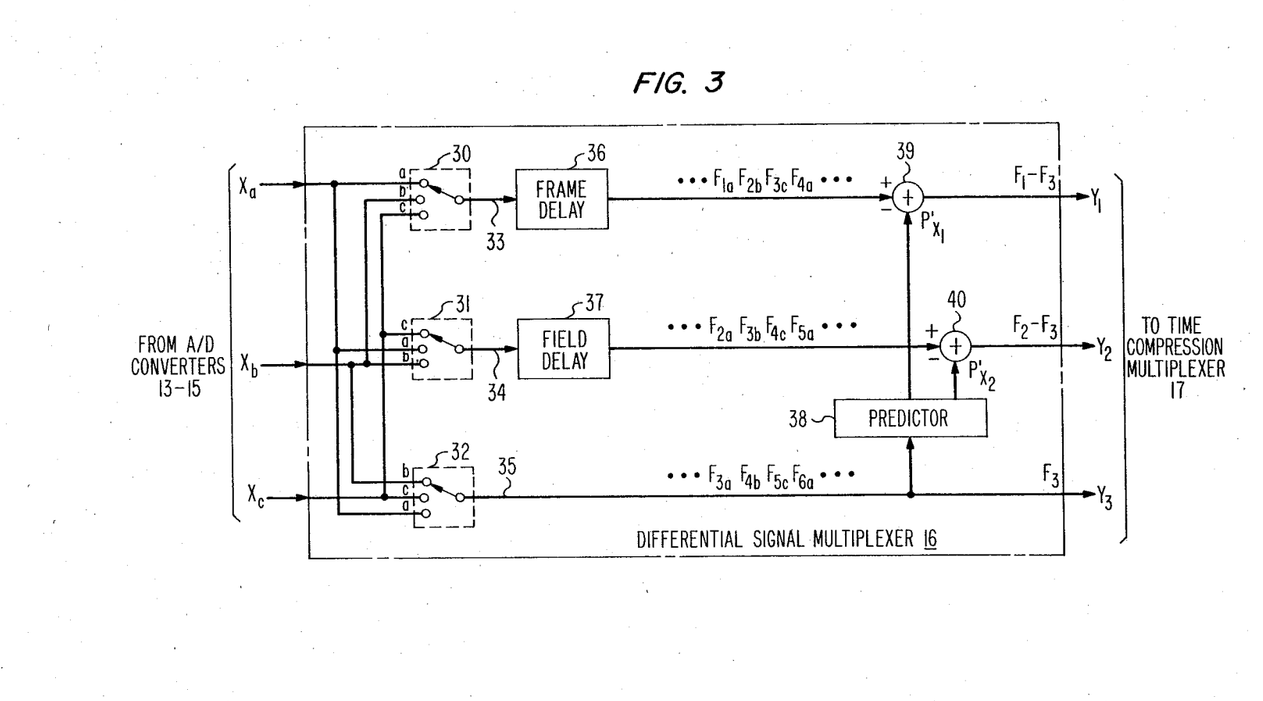
FIG. 3 is a block diagram of an exemplary Differential Signal Multiplexer used in the arrangement of FIG. 1 for generating one field signal as is and one field differential signal and one frame differential signal.

Turning now to FIG. 3 illustrating an exemplary implementation of Differential Signal Multiplexer 16 of FIG. 1, synchronized digital signals $X_a$ to $X_c$ from A/D converters 13-15, respectively, are terminated on a separate input of each of three switching means 30 to 32 such that each of the corresponding input terminals are connected to a different one of the three A/D converter 13-15 outputs. More particularly, the outputs from A/D converters 13-15 are connected to (a) the top, middle and bottom input terminals of switching means 30, respectively, (b) the middle, bottom and top input terminals of switching means 31, respectively, and (c) the bottom, top and middle input terminals of switching means 32, respectively.

The three switching means 30-32 are arranged to move in synchronism from their top positions, to the middle position, to the bottom position, and back to the top position, etc. Switching means 30-32 also all change positions simultaneously preferably sometime during a vertical blanking period in such a way that complete fields of the input TV signal are routed to either the top, middle or bottom paths 33-35, respectively, at the output of switching means 30-32.

In FIG. 3, the top path 33 contains a delay means 36 which provides a delay of exactly one frame period of the exemplary NTSC signal. The middle path 31 contains a delay means 37 which provides a delay of approximately one field period of the exemplary NTSC signal. This arrangement of switching means 30-32 and delay means 36 and 37 ensures that during any one field period, three successive fields of only one source will be available at any instant of time for processing and transmission, as indicated by the sequence of labeled fields in FIG. 3 which is shown in greater detail in FIG. 4.

More particularly, when the switching means 30-32 connect their top terminals to each output, switch 30 allows the field 1 signal ($F_{1a}$) from source 10 (source "a") to enter delay means 36. During the next field when switching means 30-32 connect their middle terminals to each output, the previous field from source 10 has traveled approximately half-way through delay means 36 while a second field ($F_{2a}$) from source 10 (source "a") enters delay means 37. Finally, when switching means 30-32 connect their bottom terminals to each output, a third field ($F_{3a}$) from source 10 (source "a") enters path 35 while concurrent therewith the first and second fields from source 10 exit from delay means 36 and 37, respectively. This description can similarly be applied to three fields from each of sources 11 and 12.

Figure 6:
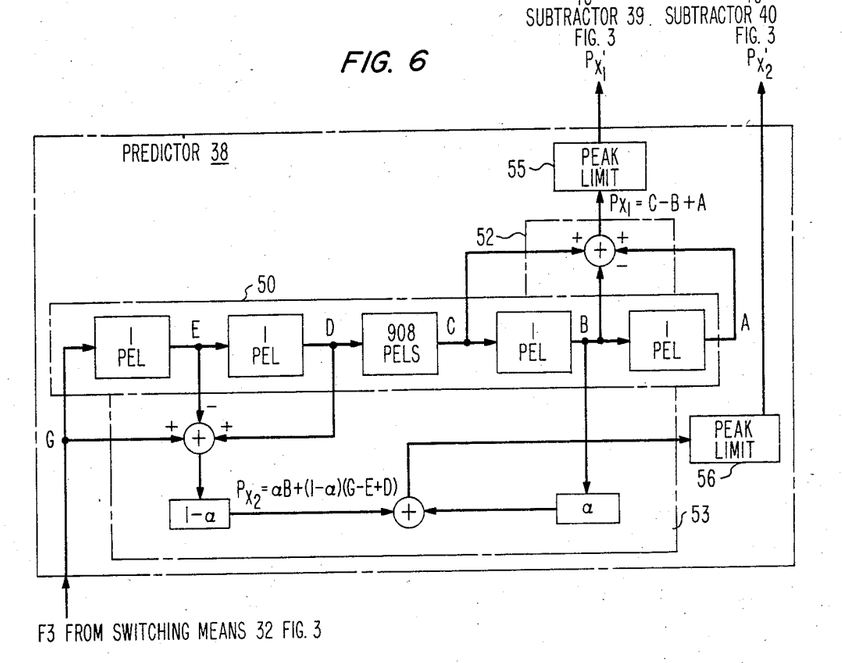
FIG. 6 is a block diagram of an exemplary predictor for use in the Differential Signal Multiplexer of FIG. 3.

In FIG. 3, a predictor 38 is responsive to the output from switching means 32 on path 35 and produces the peak-limited predictions $P'_{X1}$ and $P'_{X2}$ defined in Equation (1). Details of an exemplary arrangement of predictor 38 are shown in FIG. 6. Essentially, predictor 38 comprises a 912-pel tapped delay line 50, a first and a second arithmetic logic circuit 52 and 53 which computes $P_{X1}$ and $P_{X2}$ respectively, and, finally, a first and a second peak clipping circuit 55 and 56 to ensure that the predictions $P_{X1}$ and $P_{X2}$, respectively, fall in the same range as the original pels. The taps from tapped delay line 50, used by the logic circuits 52 and 53, are in accordance with the appropriate one of Eq. (1).

Figure 4:
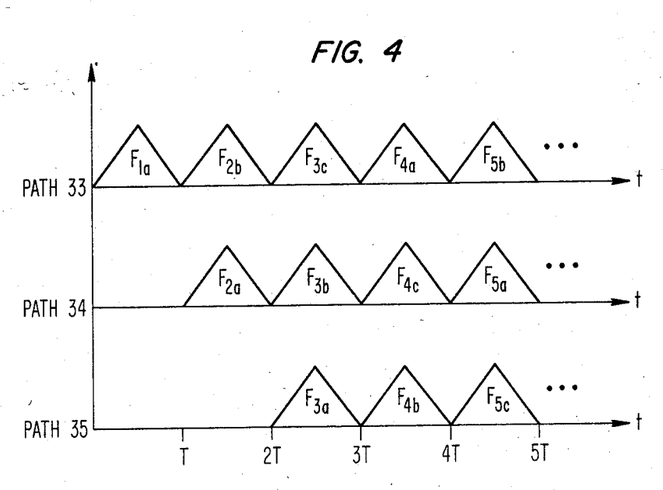
FIGS. 4 and 5 are Input and Output waveforms, respectively, of the exemplary Differential Signal Multiplexer of FIG. 3.
Figure 5:
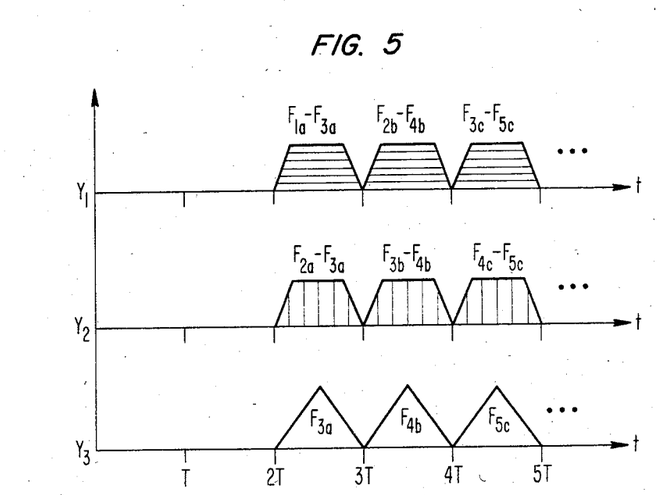
Figure 11:
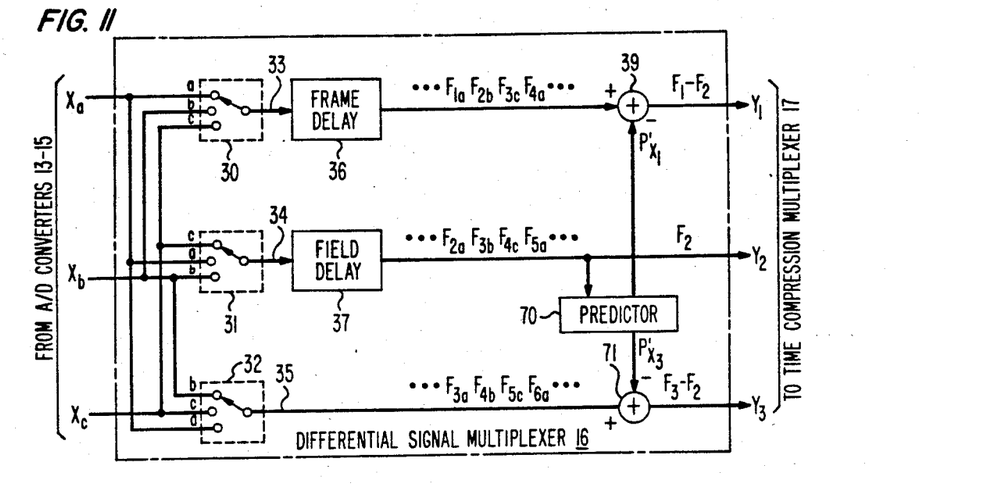
FIG. 11 is a block diagram of an exemplary Differential Signal Multiplexer of FIG. 1 for generating one field signal as is and two field differential signals.

Returning to FIG. 3, the outputs $P'_{X1}$ and $P'_{X2}$ from predictor 38 are subtracted in subtractors 39 and 40, respectively, from the respective outputs of delay means 36 and 37 to provide the $F_1-F_3$ and $F_2-F_3$ differential signals, respectively. The three output signals $Y_1-Y_3$ from FIG. 3 are then transmitted to Time Compression Multiplexer 17 shown in greater detail in FIG. 7. The three output signals derived from the field signals of FIG. 4 are shown in FIG. 5. It is to be understood that an alternative arrangement to that of FIG. 3 for obtaining (1) the $Y_1$ signal as the signal transmitted "as is" instead of the $Y_3$ signal of FIG. 3, (2) the $Y_2$ signal as a field differential signal comparable to that in FIG. 3, and (3) the $Y_3$ signal as a frame differential signal, is shown in FIG. 14. The operation of the elements 30-40 of FIG. 14 are the same as the corresponding elements of FIG. 3. As seen in FIGS. 3, 11 and 14, elements 30-37 effectively form a serial-to-parallel signal conversion means while elements 38-40 form the "as is" and differential output signals.

The purpose of Time Compression Multiplexer 17 is to combine the three signals ($Y_1$, $Y_2$ and $Y_3$) from the Differential Signal Multiplexer 16 into a single signal, hereinafter designated Z. In other words, Time Compression Multiplexer 17 time compresses the three inputs over every T-second period into a single output with the same duration. Such function can be achieved as shown in FIG. 7 by writing each of the digital words $Y_1-Y_3$ into a separate random access memory (RAM) 60-62 at one speed and reading these words out at a faster speed. Such operation is shown pictorially in FIGS. 8 and 9, where FIG. 8 shows the inputs $Y_1-Y_3$ to Time Compression Multiplexer 17 and each of RAMs 60-62, respectively, and FIG. 9 shows the time compressed output signal Z from Multiplexer 17 during one time period shown in FIG. 5. The ratio of the read clock rate to the write clock rate for the RAMs 60-62 is the time compression factor, which should be greater than 1 for time compression. Since the time compression is to be done over a T-second period, one solution would be to write all of the $Y_1$ signals into the associated RAMs 60-62 for the field period before reading them out appropriately for multiplexing. However, such solution would require the RAMs to accommodate entire fields of signals. Instead, it is proposed here that time compression be done over a TV scan-line interval (approximately 63.6 microseconds) so that only line memories are needed.

Figure 8:
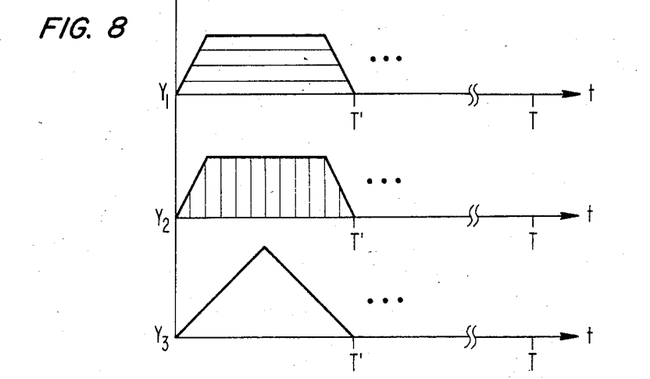
FIGS. 8 and 9 are Input and Output waveforms, respectively, of the exemplary Time Compression Multiplexer of FIG. 7.
Figure 9:
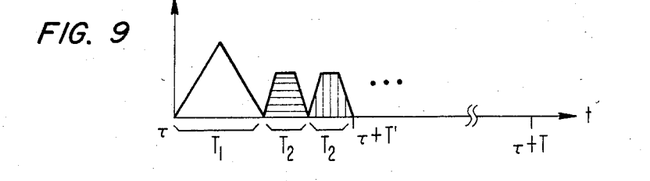

More specifically, consider a line duration T' within a T-second period shown in FIGS. 8 and 9. As before, $Y_3$ is the original 4.2 MHz bandwidth TV; $Y_1$ and $Y_2$ are each a 2 MHz bandwidth differential signal; and $\tau$ in the output Z is the processing delay. The T'-second line of $Y_3$ is time compressed by a factor of $\alpha (\alpha > 1)$ so that the resultant signal occupies $T_1$ seconds ($T_1 < T'$). Likewise, $Y_1$ and $Y_2$ are both compressed by $\beta(\beta > 1)$ so that each of their resultants occupies $T_2$ seconds ($T_2 < T_1 < T'$). It is required that these three time compressed signals be contained in T', i.e., $$\frac{T'}{\alpha} + 2\frac{0.83T'}{\beta} = T'. \qquad (2)$$

The factor 0.83 is due to the deletion of the differential signal horizontal blanking intervals, which are identically zero and need not be sent. The above simplifies to $$\frac{1}{\alpha} + \frac{1.66}{\beta} = 1. \qquad (3)$$

If the total TCM sigal bandwidth is to be minimized, then we need to set the three time compressed signals to have the same bandwidth. This can be written mathematically as $$\alpha f_3 = \beta f_2 = \beta f_1 \qquad (4)$$

where $f_3$, $f_2$ and $f_1$ are the maximum frequencies of $Y_3$, $Y_2$ and $Y_1$, respectively. In this exemplary case, $f_3 = 4.2$ MHz, $f_2 = f_1 = 2$ MHz, and the solutions to (3) and (4) are $$\alpha \sim 1.79; \beta = 3.76. \qquad (5)$$

This yields $T_1 \sim 0.56T'$ and $T_2 \sim 0.22T'$. The maximum frequency of the combined output is given by Eq. (4) and is 7.52 MHz, as compared to 12.6 MHz obtained in a straightforward TCM of the three TVs. In the above case, the TCM bandwidth has been minimized by the deletion of the horizontal blanking intervals in the differential signals and also the equal setting of all time compressed signal bandwidths as shown in Eq. (4). One obvious drawback, however, is that the compression factors required are non-integer as given in Eq. (5). To circumvent this difficulty, one can simply choose $\alpha=2$ and $\beta=4$ exactly, i.e., compressing the original signal by two and the differential parts by four with all their horizontal blankings retained. This practical case is much easier to implement with a slightly larger bandwidth of 8.4 MHz. In addition, because the differential signals ($Y_1, Y_2$) have much smaller amplitudes than the original signal ($Y_3$), it is actually advantageous from the standpoint of FM link optimization to have the original signal compressed more than the differentials.

Returning to FIG. 7, the time compressed outputs $Y_1$ and $Y_2$ from RAMs 60 and 61 are time multiplexed in multiplexer 63 and transmitted through an Amplitude Compandor 64. The differential signals are chosen such that their amplitudes are small compared to the original signal on the average. The Amplitude Compandor 64 serves to compress the large voltage levels of the differential signals so as to make better use of the FM deviation. This has been found to be very useful to suppress the effect of transmission noise on picture quality. Finally, the time compressed and amplitude companded differential signals $Y_1$ and $Y_2$ are multiplexed with the time compressed field signal $Y_3$ from RAM 62 in a multiplexer 65 to generate the output signal Z.

In summary then, the present system takes three NTSC TV signals and combines them into a 7.52 MHz, or 8.4 MHz, signal for transmission. The multiplexing technique is TCM, and the bandwidth reduction is the result of the use of differential signals. The transmission format is three fields from one TV source compressed into one ordinary field period. Thus, the transmission to, for example, a satellite of a satellite communication system, is switched sequentially between the three TV sources at a rate equal to the field or vertical scanning frequency of ordinary NTSC TV (approximately 60 Hz). If the three TV sources are synchronized with one another, then the transmitter/multiplexer requires only three field memories. Otherwise, additional memory is needed for synchronization. In either case, the receiver requires only three field memories, as will be shown hereinafter.

With three TV sources, each producing stereo audio, a total of six audio waveforms must be transmitted. Sending the stereo audio from each source along with its video by inserting digital audio in either the vertical or horizontal blanking periods is here suggested. As for the above-described case where the horizontal blanking periods of the differential signals are deleted in transmission, the audio signals may be included in some convenient segment of the vertical blanking period. This of course will lead to a slightly more stringent timing requirement as well as some additional buffer memory.

As for the practical case where the horizontal blankings of the differential signals are retained for transmission, then the insertion of digital audio in these blanking periods can be done quite easily. Within a group of three video lines (one unchanged original plus two differentials), there are two horizontal blankings from the differential lines available. One of these two blankings can be used for one audio and the other blanking for the other audio. Within one of these time compressed horizontal blanking intervals ($\sim 2.7$ $\mu$sec), the audio samples must be included from three TV scan line durations. Now each audio signal requires sampling at $\sim 32$ kHz, and with near-instantaneous companding, 10 bits per sample are sufficient. Thus, it is suggested that the audio be sampled exactly twice the TV line scan rate, yielding a total of six samples or 60 bits from the three scan lines for transmission in the prescribed time compressed horizontal blanking period. For this, twenty multilevel pulses could be used to represent the 60-bit information. At a baud rate equal to 9/4 times the color subcarrier frequency ($\sim 8.06$ MHz), the six audio samples from the three lines plus another pulse for bit timing would just fill the 2.7 $\mu$sec time slot.

There are several ways of mapping the 60+ bits from the three lines into twenty multilevel pulses. Because the three TV lines are from three different fields, additional memory is needed to store their audio samples, but this requirement seems trivial compared to the video counterpart.

Use of TCM in satellite systems where uplinks are not colocated requires that the three TV signals be synchronized, at least to the extent that their vertical blanking periods overlap. This condition is not very stringent compared with that of some digital TDMA systems being proposed or in operation. Other than the additional synchronization hardware required for the transmitters, the only minor imposition in the system is that the receiver be able to demodulate the FM signal subject to short discontinuities in the received carrier at the vertical scanning frequency.

If the three TV sources are transmitted through noncolocated uplinks, then the processing in each transmit earth station needs only two field memories (instead of three) to generate the differential signals required. The input switches in FIG. 3 are also unnecessary. A similar saving in receiver memory is possible too if only one TV is to be received in a downlink earth station.

Figure 10:
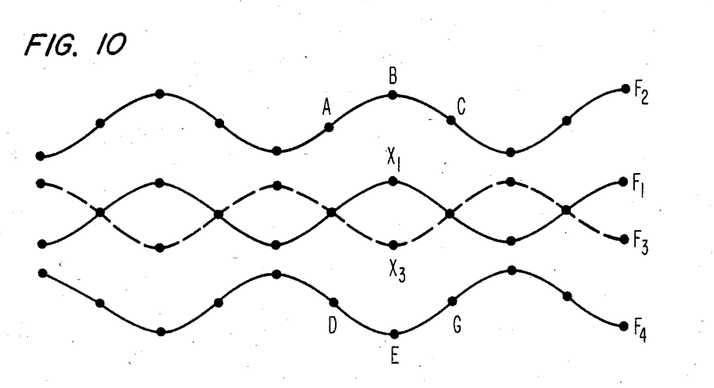
FIG. 10 illustrates interlaced lines from three successive fields with a color subcarrier for generating two field differential signals in the arrangement of FIG. 11.

As stated hereinbefore, the present invention can also be performed using one field signal as is and two field differential signals. Using the picture element (pel) definition shown in FIG. 10, the field differential signals might be defined as:

$$F_1 - F_2 = X_1 - P_{X_1}$$

where $$P_{X_1} = \alpha B + (1-\alpha)(D+G-E) \qquad (6)$$

and $$F_3 - F_2 = X_3 - P_{X_3}$$

where $$P_{X_3} = \alpha E + (1-\alpha)(A+C-B).$$

Figure 12:
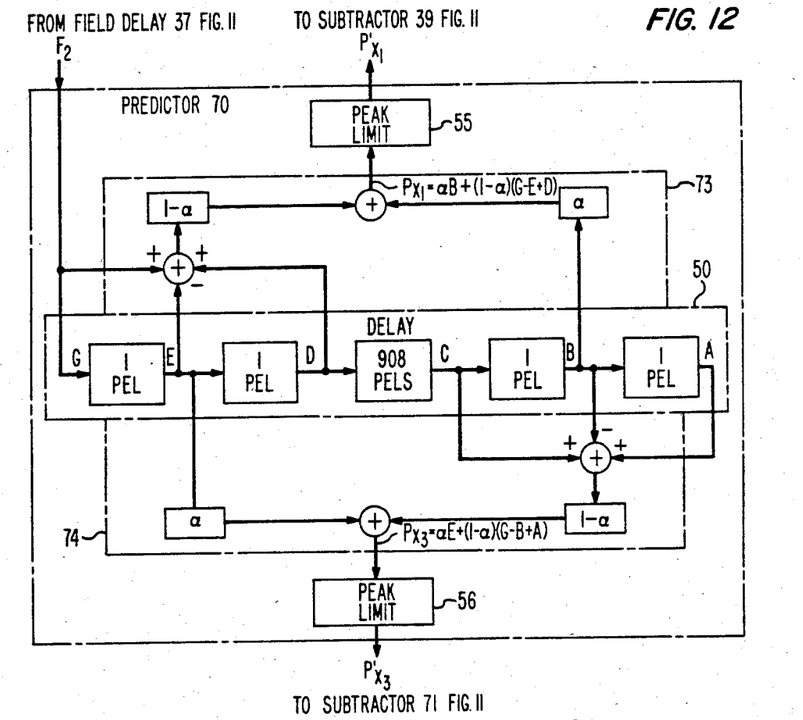
FIG. 12 is a block diagram of an exemplary predictor for use in the Differential Signal Mutiplexer of FIG. 11.

An arrangement for implementing the Differential Signal Multiplexer 16 of FIG. 1 to generate a baseband field signal, as is, and two field differential signals is shown in FIGS. 11 and 12, which is similar to the arrangements shown in FIGS. 3 and 6.

More particularly, in FIG. 11, the switching means 30–32 and delay means 36 and 37 function as described for the corresponding elements in FIG. 3. However, in FIG. 11, predictor 70 receives the delayed field signal in path 34, corresponding to the middle field signal of the three field sequence used for transmission purposes, and generates therefrom, a first peak limited prediction, $P'_{X1}$, and a second peak limited prediction, $P'_{X3}$. The first prediction is used in subtractor 39 to produce the field differential signal $F_1-F_2$ in path 33 while the second prediction is used in a subtractor 71 in path 35 to generate the second field differential signal $F_3-F_2$ for transmission to Time Compression Multiplexer 17.

A typical arrangement for predictor 70 to implement Eq. (6) is shown in FIG. 12 and is similar to the arrangement shown in FIG. 6 except that logic circuits 52 and 53 of FIG. 6 must be modified to the arrangements 73 and 74, respectively, shown in FIG. 12. Furthermore, to accommodate the output signals $Y_1-Y_3$ from FIG. 11, Time Compression Multiplexer 17 shown in FIG. 7 should be modified to input the $Y_2$ signal on path 34 of FIG. 11 into RAM 62 of FIG. 7, and the $Y_3$ signal on path 35 of FIG. 11 into RAM 61 of FIG. 7.

Figure 13:
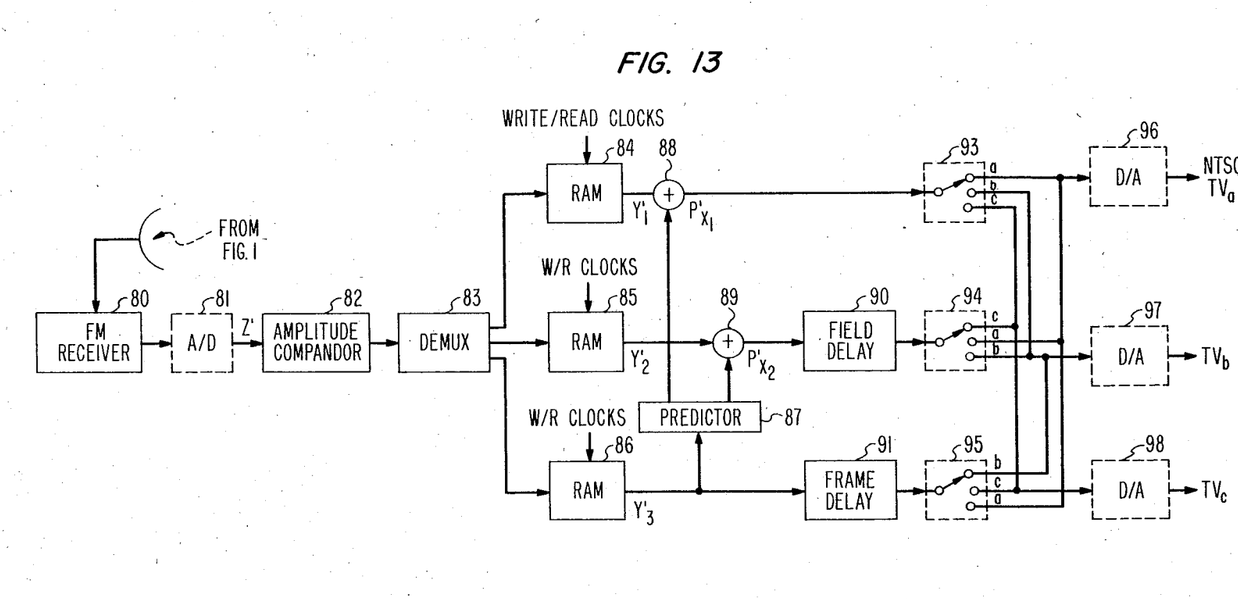
FIG. 13 is a block diagram of an exemplary receiver for recovering the three television picture signals transmitted by the arrangement of FIG. 1.

FIG. 13 shows an exemplary Receiver for receiving the signals transmitted by the Transmitter of FIG. 1 as shown in FIG. 9. In FIG. 13, the received FM waveform is demodulated in FM receiver 80 to recover the TCM baseband waveform. The demodulated signal is then digitized, if necessary, in optional A/D converter 81 to generate the signal $Z'$ which would be identical to signal $Z$ of FIG. 1 except for the transmission noise and channel distortion added. If suitable analog circuitry is available for processing the demodulated signal as explained heretofore for A/D Converters 13-15 of FIG. 1, then Converter 81 of FIG. 13 can be avoided.

Figure 7:
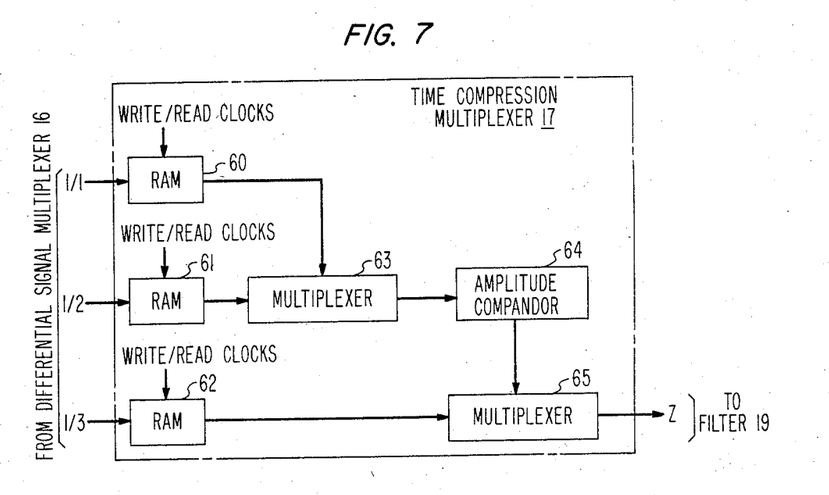
FIG. 7 is a block diagram of an exemplary Time Compression Multiplexer used in the arrangement of FIG. 1.

An amplitude compandor 82 is used to undo the companding done to the composite waveform in Amplitude Compandor 64 of FIG. 7. The three segments in this waveform, comprising the original field signal and the two differential signals, are then separated by a demultiplexer 83 and written into three separate random-access-memories (RAMs) 84-86 at a first predetermined speed. The three signals are read out of RAMs 84-86 at slower speeds in order that these signals be expanded to the full scan line length. The expansion factors, the ratio of write clock rate to read clock rate, are precisely the compression factors used in the transmitter by RAMs 60-62 in FIG. 7. Approximations to $Y_1$, $Y_2$ and $Y_3$, denoted with a prime, are then obtained.

The same predictor 87 as used in the transmitter is used to convert the differential signals into the original field signals. In FIG. 13, predictor 87 is shown disposed as the predictor 38 of FIG. 3 to recover the original fields from the field and frame differential signals generated by the arrangement of FIG. 3. More particularly, predictor 87 generates the peak limited predictions $P'_{X1}$ and $P'_{X2}$ as shown in FIG. 6. Prediction $P'_{X1}$ is then added to the $Y'_1$ signal from RAM 84 in adder 88 to recover the original first field signal, and prediction $P'_{X2}$ is added to the $Y'_2$ signal from RAM 85 in adder 89 to recover the original second field signal. It is to be understood that predictor 87 would have to be connected differently if two field differential signals or a different frame and field differential signal were originally transmitted.

The output from adder 89 is delayed for approximately one field period in field delay means 90 while the output from RAM 86 is delayed for approximately one frame period in frame delay means 91. The three output switching means 93-95 are disposed in the top, middle and bottom paths, respectively, in FIG. 13 and function, similar to that described for switching means 30-32 of FIG. 3, to route the output digital signals of the original fields to their appropriate outputs. It is to be understood that the output switching means 93-95 move in synchronism from the top position to the middle position, to the bottom position, and back to the top position, etc. The output digital signals may, or may not, then be converted to analog signals in optional D/A converters 96-98 for display or local distribution. Alternative arrangements to that shown in FIG. 13 are shown in FIGS. 15 and 16. More particularly, FIG. 15 is an arrangement comparable to FIG. 13 which provides that the $Y'_1$ signal is recovered "as is" instead of the $Y'_3$ signal of FIG. 13, and that the $Y'_2$ and $Y'_3$ signals are field and frame differential signals, respectively. FIG. 16 is an arrangement similar to that of FIG. 13 which is the inverse of FIG. 11 where the $Y'_2$ signal is the "as is" signal and the $Y'_1$ and $Y'_3$ signals are field differential signals. It is to be understood that the correspondingly numbered elements of FIGS. 13, 15 and 16 function in the manner described for FIG. 13. Essentially elements 87-89 function to recover the three television picture signals concurrently received as an "as is" and two differential signals, while elements 90, 91 and 93-95 function as a parallel-to-serial signal converter.

It is to be understood that the above-described embodiments are simply illustrative of the principles of the invention. Various other modifications and changes may be made by those skilled in the art which will embody the principles of the invention and fall within the spirit and scope thereof. More particularly, application of the present invention to non-NTSC color TV signals is also possible. Although with Phase Alteration Line (PAL) system signals the color subcarrier phase is not the same as with NTSC signals, by a slight shift in the sampling pattern from line to line, the same differential signals can be defined and the same transmission system can be used.

What is claimed is:

1. A method of transmitting three successive television signals from a television source comprising the steps of:
   (a) transmitting a first line or field television signal from a television source as is, but time compressed by a predetermined amount, to fit in a first portion of a line or field period, respectively, of a standard television signal;
   (b) transmitting a second line or field television signal from the television source as a first differential signal, but time compressed by a predetermined amount, to fit in a second portion of said line or field period, respectively, of the standard television signal not forming a part of said first portion; and
   (c) transmitting a third line or field television signal from the television source as a second differential signal, but time compressed by a predetermined amount, to fit in a third portion of said line or field period, respectively, of the standard television signal not forming a part of said first and second portions.

2. A method of transmitting three successive television signals according to claim 1 wherein in step (a) said television signal is a field signal and in steps (b) and (c), each of said first and second differential signals are separate field differential signals.

3. A method of transmitting three successive television signals according to claim 1 wherein in step (a) said television signal is a field signal and in steps (b) and (c), said first and second differential signals are a field differential and a frame differential signal, respectively.

4. A method of transmitting three successive television signals according to claim 1 wherein in step (a) said television signal is a line signal and in steps (b) and (c) said first and second differential signals are line differential signals.

5. A television signal transmitter comprising:
   first multiplexing means (16) responsive to three successive picture signals from a standard television signal source for generating one of said three successive picture signals as is as one of three output signals from the first multiplexing means and for generating a first and a second differential signal between said one of the three successive picture signals generated as is and the other two of the three successive picture signals, respectively, as the remaining two of the three output signals from the first multiplexing means;
   second multiplexing means (17) responsive to the three output signals from said first multiplexing means for time compressing said one as is output signal by a first predetermined amount to fit in a first portion of the standard television signal time period and for time compressing each of said first and second differential output signals by a second predetermined amount to fit in a second and a third portion, respectively, of said standard television signal time period not forming a part of said first portion; and
   means (18–21) capable of transmitting the time compressed signals from the second multiplexing means during an associated standard television picture signal time period.

6. A television signal transmitter according to claim 5 wherein said first multiplexing means is capable of processing three successive picture signals from a first television signal source, then a second television signal source and then a third standard television signal source in a cyclical manner.

7. A television signal transmitter according to claim 5 wherein the first multiplexing means comprises:
   serial-to-parallel conversion means (30–32, 36, 37, FIGS. 3, 11) for concurrently making available three successive television picture signals from the standard television signal source;
   means (38–40 FIG. 3; 39,70,71, FIG. 11) responsive to said three concurrent television picture signals from the serial-to-parallel conversion means for generating therefrom said one of the three successive picture signals as is and said first and second differential signals.

8. A television signal transmitter according to claim 5 wherein said three successive television signals are three television line signals and said first and second differential signals are first and second line differential signals, respectively.

9. A television signal transmitter according to claim 7 wherein said three successive television signals are three television field signals and said first and second differential signals are first and second field differential signals, respectively.

10. A television signal transmitter according to claim 7 wherein said three successive television signals are three television field signals and said first and second differential signals are a frame differential signal and a field differential signal, respectively.

11. A television signal transmitter according to claim 7 wherein the serial-to-parallel conversion means comprises:

switching means capable of routing the first, second and third successive television picture signals over a first, second and third path, respectively;
first delay means disposed in the first path capable of providing a delay approximately equal to the time period of two of said successive television picture signals to the first one of the three successive television picture signals; and
second delay means disposed in the second path capable of providing a delay approximately equal to the time period of one of said television picture signals to the second one of the three successive television picture signals, said first and second delay means causing the three successive television picture signals to concurrently propagate on said first, second and third paths.

12. A television signal transmitter according to claim 11 wherein the television picture signals are field signals and the field signal to be generated "as is" is propagating in the third path, the generating means comprising:
   means responsive to the field signal propagating in the third path for generating therefrom a first prediction of a predetermined pel of the field signal propagating in the third path based on an algebraic combination of weighted values of a first group of nearby pels, and a second prediction of a predetermined pel of the field signal propagating in the third path based on an algebraic combination of weighted values of a second group of nearby pels;
   first combining means capable of combining said first prediction and the field signal propagating in the first path to generate a frame differential signal; and
   second combining means capable of combining said second prediction and the field signal propagating in the second path for generating a field differential signal.

13. A television signal transmitter according to claim 11 wherein the television picture signals are field signals and the field signal to be generated "as is" is propagating in the first path, the generating means comprising:
   means responsive to the field signal propagating in the first path for generating therefrom a first prediction of a predetermined pel of the field signal propagating in the first path based on an algebraic combination of weighted values of a first group of nearby pels, and a second prediction of a predetermined pel of the field signal propagating in the first path based on an algebraic combination of weighted values of a second group of nearby pels;
   first combining means capable of combining said first prediction and the field signal propagating in the third path for generating a frame differential signal; and
   second combining means capable of combining said second prediction and the field signal propagating in the second path for generating a field differential signal.

14. A television signal transmitter according to claim 11 wherein the television picture signals are field signals and the field signal to be generated "as is" is propagating in the second path, the generating means comprising:
   means responsive to the field signals propagating in the second path for generating therefrom a first prediction of a predetermined pel of the field signal propagating in the second path based on an algebraic combination of weighted value of a first group of nearby pels, and a second prediction of a predetermined pel of the field signal propagating in the second path based on an algebraic combination of weighted values of a second group of nearby pels;

first combining means capable of combining said first prediction and the field signal propagating in the first path for generating a first field differential signal; and second combining means capable of combining said second prediction and the field signal propagating in the third path for generating a second field differential signal.

15. A television signal transmitter according to claim 5 wherein said second multiplexing means comprises:

first time compression means capable of time compressing the first signal received from the first multiplexing means as is by said first predetermined amount;

second and third time compression means capable of time compressing the first and second differential signals, respectively, by said second predetermined amount;

first multiplexing means capable of multiplexing said first and second time compressed differential signals; and second multiplexing means capable of multiplexing the time compressed first signal and the time compressed and multiplexed first and second differential signals for generating an output signal to said transmitting means.

16. A television signal transmitter according to claim 15 wherein said second multiplexing means further comprises:

amplitude companding means disposed to receive the multiplexed first and second differential signals and capable of compressing the large voltage levels of the first and second differential signals at the output thereof to maximize performance at the output of said transmitting means.

17. A television signal receiver responsive to an input signal from a predetermined remote transmitter during each period of a time division multiple access sequence, the input signal comprising three concurrently received signals derived from three successive television picture signals of a predetermined television picture source, where one of the concurrently received signals includes one of said three television picture signals transmitted as is, but time compressed, and the other two of the three concurrently received signals are first and second differential signals derived as differences between said one of the three television picture signals from the television picture source and each of the other two of the three television picture signals, respectively, from the television picture source also time compressed, the receiver comprising:

means capable of demodulating and separating each of the three concurrently received signals into a separate one of three paths;

means responsive to input signals on a first, second and third path from the demodulating means for time expanding each of the three input signals by an amount equivalent to that used by a remote transmitter in originally time compressing each of said three input signals;

means capable of converting the first and second differential signals into associated separate recovered ones of the television picture signals, and retaining said one of the television picture signals as is as a separate recovered one of the three television picture signals; and means for routing the first, second and third ones of the television signals at the output of the converting means to a predetermined television terminal in a proper sequence.

18. A television signal receiver according to claim 17 wherein said time expanding means comprises;

first means capable of time expanding said one signal received as is and propagating in one of the three paths by a first predetermined amount;

second means capable of time expanding said first differential signal propagating in a predetermined separate one of the three paths by a second predetermined amount; and third means capable of time expanding said second differential signal propagating in a predetermined separate one of the three paths by a third predetermined amount.

19. A television signal receiver according to claim 17 wherein said three successive television picture signals are three field signals of a television picture and said first and second differential signals are field differential signals.

20. A television signal receiver according to claim 17 wherein said three successive television picture signals are three field signals of a television picture and said first and second differential signals are a field differential signal and a frame differential signal, respectively.

21. A television signal receiver according to claim 17 wherein said converting means comprises:

means responsive to the one signal including a time expanded television picture signal received as is for providing as an output signal said as is received signal and for generating therefrom (1) a first prediction of a predetermined pel of said one signal received as is based on an algebraic combination of weighted values of a first group of nearby pels, and (2) a second prediction of a predetermined pel of said one signal received as is based on an algebraic combination of weighted values of a second group of nearby pels;

first combining means capable of combining the time expanded first differential signal and the first prediction for recovering therefrom a predetermined separate one of said three television picture signals; and second combining means capable of combining the time expanded second differential signal and the second prediction for recovering therefrom a predetermined separate one of said three television picture signals.

22. A television signal receiver according to claim 18 wherein said converting means comprises:

means responsive to an output from the first means of the time expanding means, including a television picture signal received as is, for providing as an output signal said as is received signal and for generating therefrom (1) a first prediction of a predetermined pel of said one signal received as is based on an algebraic combination of weighted values of a first group of nearby pels, and (2) a second prediction of a predetermined pel of said one signal received as is based on an algebraic combination of weighted values of a second group of nearby pel;

first combining means capable of combining the time expanded first differential signal and the first prediction for recovering therefrom a predetermined separate one of said three television picture signals; and second combining means capable of combining the time expanded second differential signal and the second prediction for recovering therefrom a predetermined separate one of said three television picture signals.

23. A television signal receiver according to claim 19 wherein said routing means comprises:

first delay means disposed to provide a delay approximately equal to the period of one television picture field signal to a recovered separate television picture signal, of a three television picture signal sequence, propagating in a second of the three paths from the demultiplexing means;

second delay means disposed to provide a delay approximately equal to a period of two consecutive television picture field signals to a recovered separate television picture signal, of a three television picture signal sequence, propagating in a third of the three paths from the demultiplexing means; and switching means capable of sequentially routing the separate recovered television picture signals propagating in predetermined separate ones of the first, second and third paths from the demodulating means, after the first and second delay means, in a proper sequence to the predetermined television terminal.

24. A television signal receiver according to claim 20 wherein said routing means comprises:

first delay means disposed to provide a delay approximately equal to the period of one television picture field signal to a recovered separate second television picture field signal of a three television picture signal sequence propagating in a second of the three paths from the demultiplexing means;

second delay means disposed to provide a delay approximately equal to a period of two consecutive television picture field signals to a recovered separate television picture field signal of a three television picture signal sequence propagating in a third of the three paths from the demultiplexing means; and switching means capable of sequentially routing the separate recovered television picture signals propagating in predetermined separate ones of the first, second and thrid paths from the demodulating means, after the first and second delay means, in a proper sequence to the predetermined television terminal.

* * * * *